(12) United States Patent
Lassen et al.

(10) Patent No.: US 9,158,801 B2
(45) Date of Patent: Oct. 13, 2015

(54) INDEXING BASED ON OBJECT TYPE

(75) Inventors: Soren Bogh Lassen, San Francisco, CA (US); Spencer Greg Ahrens, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 30 days.

(21) Appl. No.: 13/560,212

(22) Filed: Jul. 27, 2012

(65) Prior Publication Data
US 2014/0032563 A1    Jan. 30, 2014

(51) Int. Cl.
*G06F 17/30* (2006.01)

(52) U.S. Cl.
CPC .... *G06F 17/30315* (2013.01); *G06F 17/30342* (2013.01); *G06F 17/30412* (2013.01)

(58) Field of Classification Search
None
See application file for complete search history.

(56) References Cited

U.S. PATENT DOCUMENTS

| 5,991,751 | A * | 11/1999 | Rivette et al. | 1/1 |
| 7,702,685 | B2 * | 4/2010 | Shrufi et al. | 707/760 |
| 7,899,803 | B2 * | 3/2011 | Cotter et al. | 707/706 |
| 2006/0184566 | A1 * | 8/2006 | Lo et al. | 707/102 |
| 2007/0174304 | A1 * | 7/2007 | Shrufi et al. | 707/100 |
| 2010/0269158 | A1 * | 10/2010 | Ehler et al. | 726/4 |
| 2013/0318347 | A1 * | 11/2013 | Moffat | 713/168 |

OTHER PUBLICATIONS

Subquery Fundamentals [date unknown, captured on Dec. 1, 2013], Microsoft, http://technet.microsoft.com/en-us/library/ms189575(v=sql.90).aspx.*
Sheth et al., Federated Database Systems for Managing Distributed, Heterogeneous, and Autonomous Databases Sep. 1990, ACM Computing Surveys vol. 22 Issue 3, pp. 183-236.*
Howe, graph from FOLDOC Sep. 22, 1996, Free On-Line Dictionary of Computing, Imperial College Department of Computing, http://foldoc.org/graph.*
Black et al., graph Sep. 27, 2010 [verified by Wayback Machine capture on Jan. 24, 2012], Dictionary of Algorithms and Data Structures [online], US National Institute of Standards and Technology, https://web.archive.org/web/20120124110243/http://xlinux.nist.gov/dads/HTML/graph.html.*
U.S. Appl. No. 13/560,889, filed Jul. 27, 2012, Sankar.
U.S. Appl. No. 13/723,861, filed Dec. 21, 2012, Lassen.

* cited by examiner

*Primary Examiner* — Jason Liao
(74) *Attorney, Agent, or Firm* — Baker Botts L.L.P.

(57) ABSTRACT

In one embodiment, a method includes maintaining data stores for objects of a social-networking system, each data store being configured to store objects of a particular one of multiple object types indexed by a search index; receiving an object; identifying an object type of the received object; storing the received object in at least one data store being configured to store objects of the identified object type; and updating the search index of the at least one data store based on the received object.

20 Claims, 5 Drawing Sheets

INDEXING BASED ON OBJECT TYPE

TECHNICAL FIELD

This disclosure generally relates to a social-networking system.

BACKGROUND

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

DESCRIPTION OF EXAMPLE EMBODIMENTS

Figure 1:
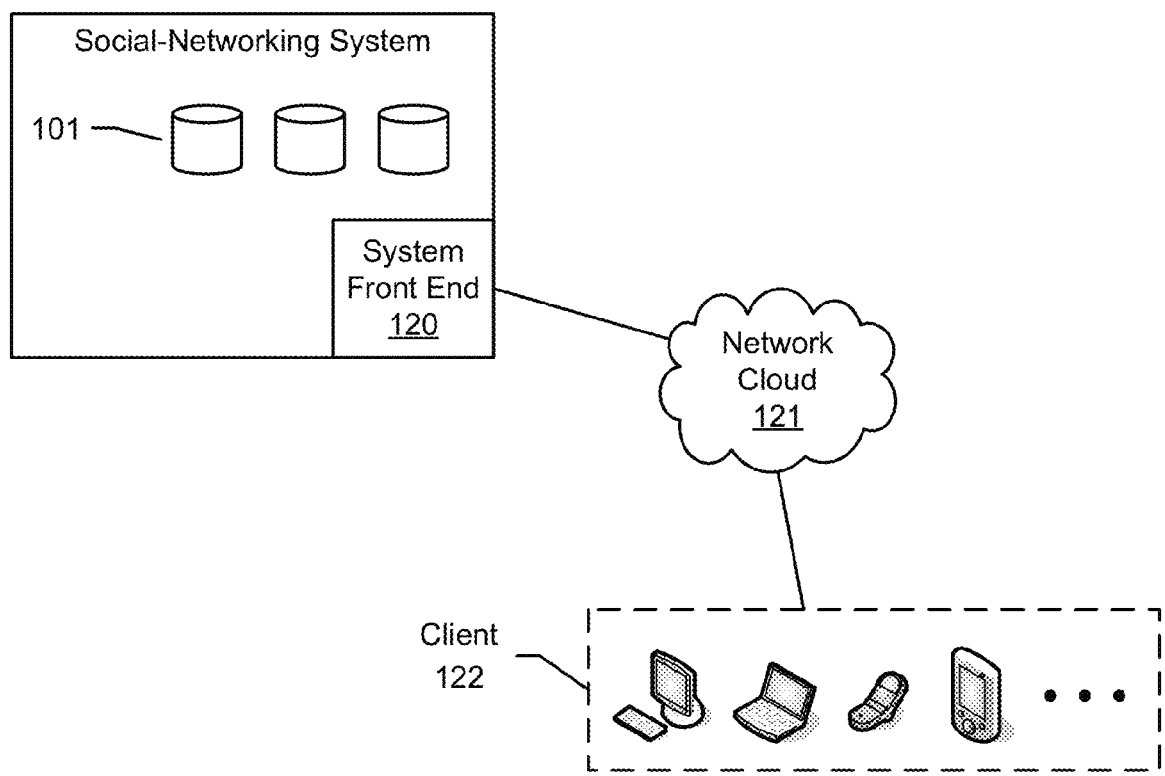
FIG. 1 illustrates an example network environment of a social-networking system.

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system. For example, the user may provide his name, profile picture, city of residence, contact information (e.g., a phone number, an email address), birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social-networking system to create a concept node comprising information associate with the concept. For example and without limitation, information associated with a concept can include a name or a title, a description, one or more images (e.g., an image of cover page of a book), a web site (e.g., an Universal Resource Locator or URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications and features, such as status updates, photo sharing, on-line calendars and events, instant messaging, and advertising. For example, a user may post a status update to a user's profile page (typically known as a wall post), which may be accessible to other users of the social-networking system (e.g., based on one or more privacy settings selected by the user). For example, the social-networking system may allow users to post photographs and other multimedia files (e.g., video clips) to a user's profile page or in a photo album, both of which may be accessible to other users of the social-networking system (e.g., based on one or privacy settings selected by the user). A photo (or a media file) may contain metadata (often called "tags") associated with the photo (e.g., time stamp, resolution). A user can also add metadata values to a photo, or tag a photo, during or after uploading the photo to the social-networking system. Some examples of the tags of a photo are author, title, location, or names of people appearing in the photo.

The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users. For example, the social-networking system may maintain an address book for a user. An address book may contain one or more contacts (e.g., a person or a business identify) and for each contact, contact information for the contact (e.g., a phone number, a user identifier for an instant messaging or IM service, an email address, a user identifier for a social-networking system, home address, or any suitable unique identifier of any suitable communication channel).

FIG. 1 illustrates an example network environment of a social-networking system. In particular embodiments, a social-networking system may comprise one or more data stores 101. For example, each data store 101 may comprise one or more storage devices. In particular embodiments, the social-networking system may store in data stores 101 a social graph comprising user nodes, concept nodes, and edges between nodes as described earlier. Each user node may comprise one or more data objects corresponding to information associated with a user (e.g., a user identifier, a name). Each concept node may comprise one or more data objects corresponding to information associated with a concept (e.g., a name, a description). Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 101 may be operably connected to the social-networking system's front end 120. A user of the social-networking system may access the social-networking system using a client device such as client device 122. In particular embodiments, front end 120 may interact with client device 122 through network cloud 121. For example, front end 120 may be implemented in software programs hosted by one or more computing devices of the social-networking system. Front end 120 may include web or HTTP server functionality, as well as other functionality, to allow users to access the social-networking system.

Client device 122 may be a desktop computer, laptop computer, tablet computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

In particular embodiments, the social-networking system may store in data stores 101 data associated with applications and services provided by the social-networking system. For example, the social-networking system may store a user's post (e.g., a post identifier, a text string, and a time stamp) in data stores 101. The post may be represented by a particular node of a social graph, while the association between the post and a second user (e.g., the second user "likes" the post) may be represented by an edge connecting the particular node and a user node for the second user in the social graph. For another example, the social-networking system may store photos (or other media files) updated by a user in data stores 101. A photo may be represented by a particular node of a social graph, while a tag between the photo and a second user may be represented by an edge connecting the particular node and a user node for the second user in the social graph.

The social-networking system may also store links (or content) of web pages and applications in data stores 101. For example, the social-networking system may store information for a web page (e.g., an identifier, a name, an URL address) in data stores 101. The information for the web page may be represented by a particular node of a social graph, while association between the web page and a second user (e.g., the second user "likes" the web page, or the second user "checks in" a place corresponding to the web page) may be represented by an edge connecting the particular node and a user node for the second user in the social graph. For another example, the social-networking system may store information for an application (e.g., an identifier, a name, a description, an URL link to the application) in data stores 101. The information for the application may be represented by a particular node of a social graph, while association between the application and a second user (e.g., the second user "likes" the application, or the second user "subscribes" to the application) may be represented by an edge connecting the particular node and a user node for the second user in the social graph.

For the example social-networking system illustrated in FIG. 1, the amount of data (e.g., data for a social graph) stored in data stores 101 may be very large. For example, a social graph used by Facebook of Menlo Park, Calif. can have a number of nodes in the order of $10^8$, and a number of edges in the order of $10^{10}$. Typically, a large collection of data such as a large database may be divided into a number of partitions. Each partition may be held by separate servers or at separate physical locations. As the index for each partition of a database is smaller than the index for the overall database, the partitioning may improve performance in accessing the database. As the partitions may be distributed over a large number of servers (while each partition may be duplicated at geographically diverse locations), the partitioning may also improve performance and reliability in accessing the database. Ordinarily, a database may be partitioned by storing rows (or columns) of the database separately. A database may also be partitioned by using a hashing algorithm. A database may also be partitioned by some real-world segmentation of the data held by the database (e.g., customers in each time zone of the United States). Particular embodiments describe methods for partitioning storage of a collection of data based on object types. Particular embodiments may store data objects in a plurality of partitions, each partition holding data objects of a single object type. Particular embodiments may retrieve results of a search query by submitting the search query to a partition storing objects of the same object type as the search query's expected results.

Figure 2:
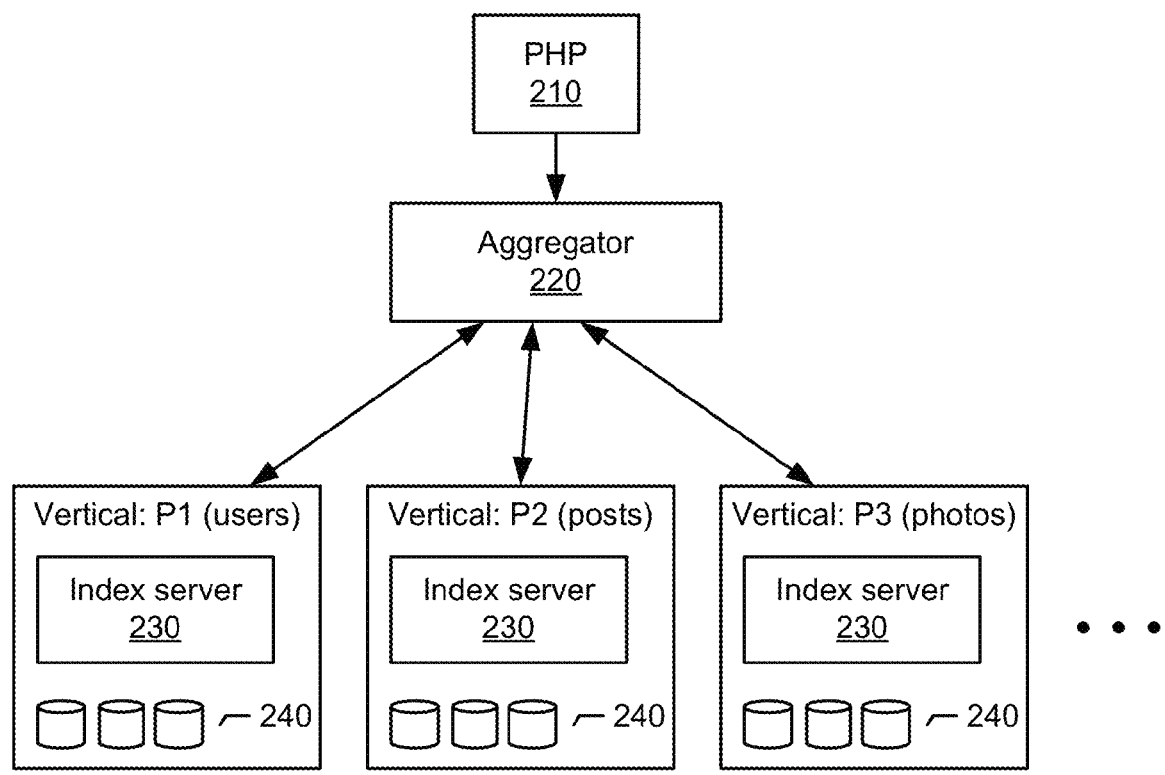
FIG. 2 illustrates an example partitioning for storing objects of a social-networking system.

FIG. 2 illustrates an example partitioning for storing objects of a social-networking system. In the example of FIG. 2, a plurality of data stores or verticals (e.g., P1, P2, P3, and so on) may store objects of a social networking system. In particular embodiments, each data store may be configured to store objects of a particular one of a plurality of object types in respective data storage devices 240. An object type may be user, photo, post, web page, or application. Other examples of object types may be music, comment, event, message, offer (e.g., coupon), and review. This disclosure contemplates any suitable object types for a social-networking system. For example, vertical P1 illustrated in FIG. 2 may store user objects; vertical P2 may store post objects; vertical P3 may store photo objects (or objects of other media types such as video or audio). That is, each data store may store objects of a single object type. In particular embodiments, objects stored in each data store or vertical may be indexed by a search index. The search index may be hosted by respective index server 230 comprising one or more computing devices (e.g., servers).

Figure 3:
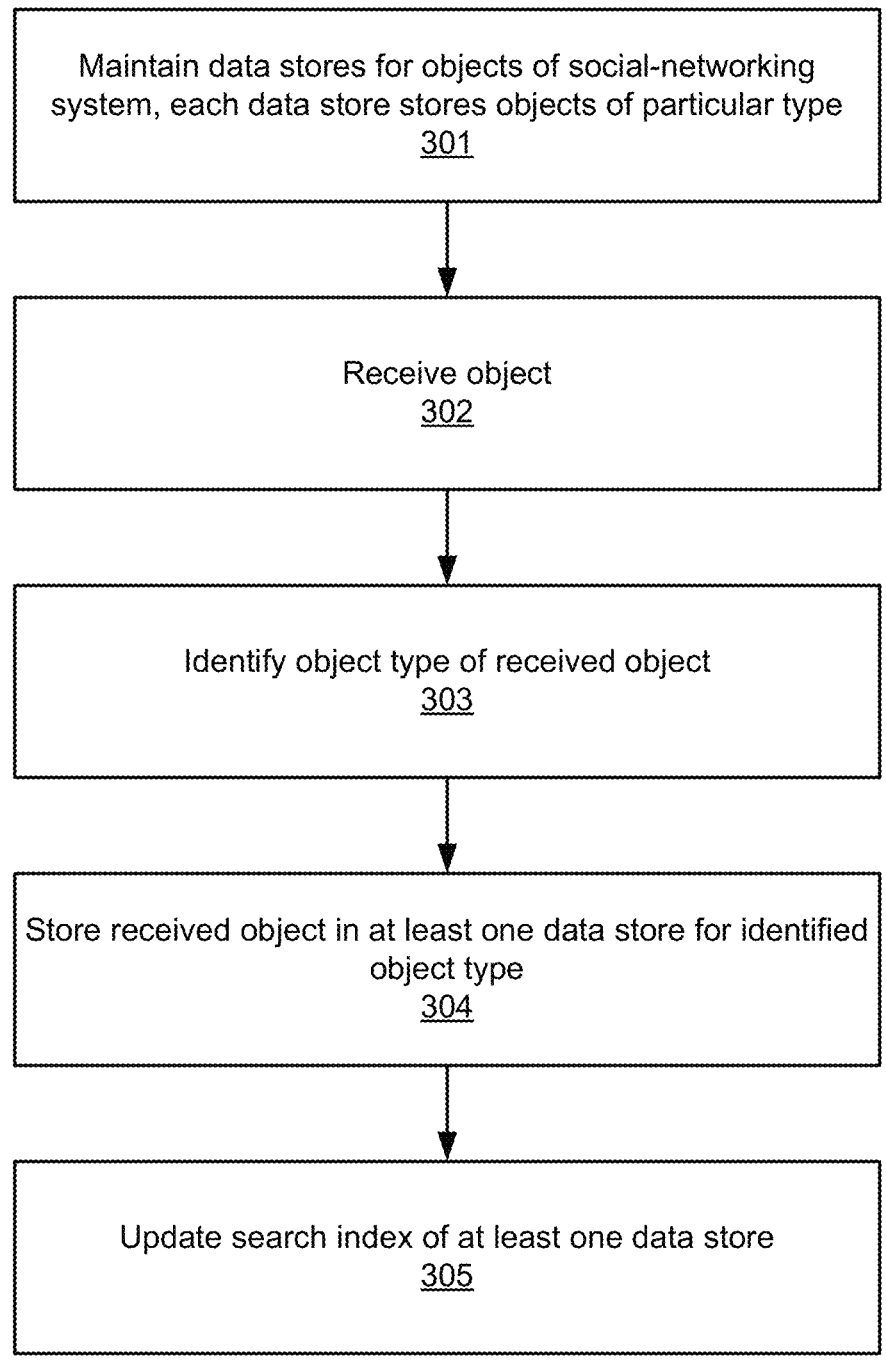
FIG. 3 illustrates an example method for storing objects.

FIG. 3 illustrates an example method for storing objects in the plurality of data stores illustrated in FIG. 2. The example method of FIG. 3 can be implemented by a server process hosted by one or more computing devices (e.g., servers) of the social-networking system. In particular embodiments, the server process may maintain a plurality of data stores for the social-networking system (301). For example, the server process may maintain data stores illustrated in FIG. 2. As described earlier, each data store may be configured to store a single type of object indexed by a search index (e.g., vertical P1 for user objects, vertical P2 for post objects, vertical P3 for photo objects, and so on). In particular embodiments, the server process may receive an object (302). In particular embodiments, the server process may identify an object type of the received object (303). For example, the server process may receive a photo uploaded to the social-networking system by a particular user, and identify an object type (e.g., photo) of the photo. The server process may assign an identifier (e.g., an character string) to the received photo. In addition, the server process may determine information associated with the received object. For example, the server process may determine one or more other users tagged in the received photo based on the received photo's metadata (or based on tagging information provided by the particular user). The server process may also receive information associated with the received objects from other processes of the social-networking system. For example, the server process may receive (e.g., from system front end 120 illustrated in FIG. 1) information indicating that a second user likes the received photo, a comment about the received photo by a third user, or the received photo being tagged to a particular location.

In particular embodiments, the server process may store the received object in at least one of the data stores, while the at least one data store being configured to store objects of the identified object type (304). For example, the server process may store the received photo described above in a data store configured to store photo objects (e.g., vertical P3 illustrated in FIG. 2). The server process may store in the data store information associated with the received photo (e.g., users liking the received photo, users tagged in the photo, a time stamp, a location, and so on). In particular embodiments, the server process may update the search index of the at least one data store based at least in part on the received object (305). For example, the server process may update (or cause index server 230 to update) the search index of the data store based on the received photo (e.g., based on the identifier of the photo). The server process may also update (or cause index server 230 to update) the search index based on information associated with the received photo (e.g., users tagged in the received photo). The server process may update (or cause index server 230 to update) the search index periodically (e.g., every 24 hours).

In some embodiments, the received object (e.g., the received photo) may correspond to a particular node of a social graph of the social-networking system. An edge connecting the particular node and another node may indicate a relationship between the received object and a user (or concept) corresponding to the other node. That is, the server process may store in the data store (of the identified object type) information of the received object, and information of one or more edges connecting to a node corresponding to the received object in the social graph. The server process may update the search index of the data store based on the received object, and relationships associated with the received object (i.e., edges in the social graph connecting to a node corresponding to the received object).

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
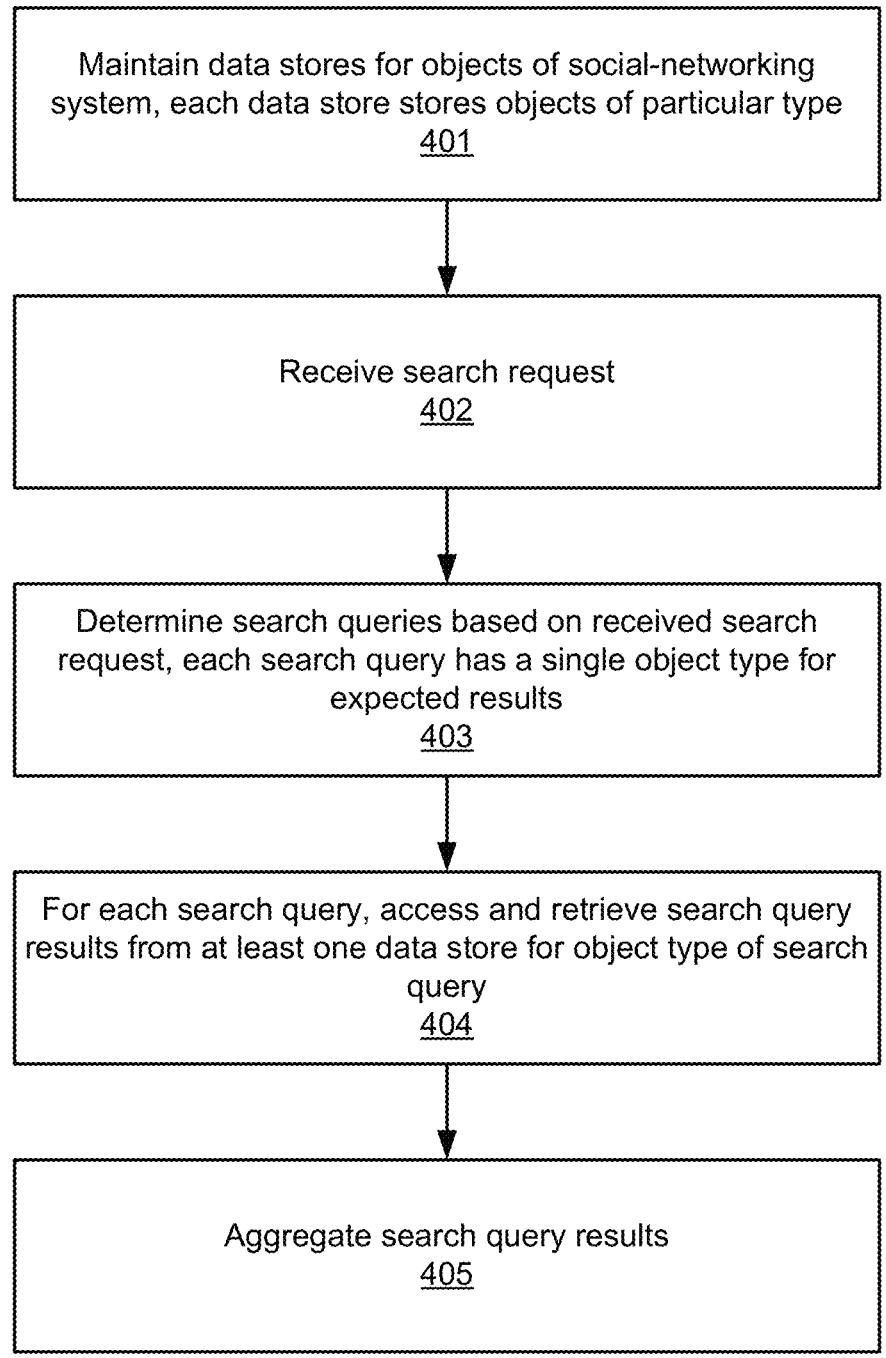
FIG. 4 illustrates an example method for searching objects.

FIG. 4 illustrates an example method for searching objects stored in the plurality of data stores illustrated in FIG. 2. The example method of FIG. 4 can be implemented by the server process described earlier. The example method of FIG. 4 can also be implemented by an aggregator process 220 illustrated in FIG. 2. The aggregator process may be one or more computing processes (or programs) hosted by one or more computing devices (e.g., servers) of the social-networking system. Particular embodiments may maintain the plurality of data stores as illustrated in FIG. 2 (401). Each of the data stores may be configured to store a single type of object indexed by a search index as described earlier. In particular embodiments, the aggregator process may receive a search request. For example, the aggregator process may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. For example, the search request can be "photos I like", "my friends' favorite pages", or "photos tagged with Tom."

In particular embodiments, the aggregator process may determine one or more search queries based on the received search request. In particular embodiments, each of the search query may have a single object type for its expected results (i.e., a single result-type) (403). In some embodiments, the search queries may comprise search queries in symbolic expression or s-expression. For example, the aggregator process may convert the search request "photos I like" to a search query (photos_liked_by:<me>). The search query (photos_liked_by:<me>) denotes a query for photos liked by a user (i.e., <me>), with a single result-type of photo.

In some embodiments, the search queries may comprise nested search queries in s-expression. For example, the aggregator process may convert the search request "my friends' favorite pages" to a nested search query:

(pages_liked_by:(friend:<me>)).

The nested search query (pages_liked_by:(friend:<me>)) comprises an inner search query (friend:<me>) nested in an outer search query (pages_liked_by:<user>). The inner search query (friend:<me>) denotes a query for first-degree friends of a user (i.e., <me>), with a single result-type of user. The outer search query (pages_liked_by:<user>) denotes a query for pages liked by a user, with a single result-type of page.

For example, the aggregator process may convert the search request "photos tagged with Tom" to a nested search query:

(tagged_in_photo:(name:tom)).

The nested search query (tagged_in_photo:(name:tom)) comprises an inner search query (name:tom) nested in an outer search query (tagged_in_photo:<user>). The inner search query denotes a query for users whose name matching "tom", with a single result-type of user. The outer search query (tagged_in_photo:<user>) denotes a query for photos that a user is tagged in, with a single result-type of photo.

Note that the example search queries described above may comprise a prefix and an object. For example, the search query (pages_liked_by:<user>) comprises a prefix pages_liked_by, and an object <user>. The object may correspond to a particular node in the social graph of the social-networking system, while the prefix may correspond to a particular type of edge (indicating a particular type of relationship) connecting to the particular node in the social graph. That is, the search query may comprise traversing the social graph from the particular node along the particular type of connecting edges to nodes corresponding to search query results. For example, the search query (pages_liked_by:<user>) may comprise traversing the social graph from a user node corresponding to <user> along "like" edges to nodes corresponding to pages liked by <user>.

In particular embodiments, the aggregator process may, for each of the search queries, access and retrieve search query results from at least one of the data stores, the at least one data store being configured to store objects of the object type of the each search query (i.e., the result-type of the each search query) (404). In particular embodiments, the aggregator process may aggregate search query results of the respective search queries (405). For example, the aggregator process may submit the search query (photos_liked_by:<me>) (with photo result-type) to photo vertical P3. The aggregator process may access index server 230 of photo vertical 230, causing index server 230 to return results for the search query (photos_liked_by:<me>).

For example, the nested search query (tagged_in_photo:(name:tom)) above comprises the inner search query (name:tom) with a single result-type of user, and the outer search query (tagged_in_photo:<user>) with a single result-type of photo. The aggregator process may rearrange the nested search query. For example, the aggregator processor may first submit the inner search query (name:tom) (with user result-type) to user vertical P1 illustrated in FIG. 2. The aggregator process may access index server 230 of user vertical P1, causing index server 230 to return search query results of users <17>, <31>, and <59> (each represented by an user identifier). That is, each user of <17>, <31>, and <59> may have a name matching "tom." The aggregator process may then re-write the nested search query to an OR combination of queries (tagged_in_photo:<17>), (tagged_in_photo:<31>), and (tagged_in_photo:<59>)), each with a result-type of photo. The aggregator process may submit the queries (tagged_in_photo:<17>), (tagged_in_photo:<31>), and (tagged_in_photo:<59>) to photo vertical P3 illustrated in FIG. 2. The aggregator process may access index server 230 of photo vertical P3, causing index server 230 to return search query results of photos for the queries (tagged_in_photo:<17>), (tagged_in_photo:<31>), and (tagged_in_photo:<59>). The aggregator process may aggregate the search query results by performing an OR operation on the search query results. For example, search query results for the search query (tagged_in_photo:<17>) may be <1001> and <1002> (each represented by a photo identifier). Search query results for the search query (tagged_in_photo:<31>) may be <1001>, <1326>, <9090>, and <5200>. Search query results for the search query (tagged_in_photo:<59>) may be <9090> and <7123>. The aggregator process may perform an OR operation on the search query results, yielding final search query results of <1001>, <1002>, <1326>, <9090>, <5200>, and <7123>.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

As described earlier, particular embodiments may partition storage of objects of the social-networking system by object types. For example, as illustrated in FIG. 2 and FIG. 3, particular embodiments may store user objects in one partition (vertical P1 illustrated in FIG. 2), store post objects in another partition (vertical P2), store photo objects in a third partition (vertical P3), and so on. For example, as illustrated in FIG. 4, particular embodiments may convert a search request (e.g., a text string from a user) to one or more search queries in that each search query has a single result-type (single object type for its expected results). Particular embodiments may submit each search query to a partition storing objects of the same type as the each search query's result-type, and retrieve search results of the each search query. Particular embodiments may aggregate search query results of the respective search queries for a final search result.

Particular embodiments may partition storage of objects of the social-networking system by recency or a duration of existence of each object (i.e., "age" of an object), as a more recent object may be more relevant to a user of the social-networking system. For example, particular embodiments may store all photo objects in a main photo partition, while storing photo objects with respective ages less than 3 months old in a recent photo partition. The recent photo partition may have smaller size than the main photo partition, thus can be more easily duplicated (e.g., over geographically diverse locations) to improve performance in accessing and retrieving photo objects. Moreover, the recent photo partition may have a smaller search index than that for the main photo partition, thus may have better performance in accessing and retrieving photo objects. For example, particular embodiments may, for a search query with a photo result-type, submit the search query to the recent photo partition first. If a number of search results from the recent photo partition exceeds a specified threshold (e.g., 10), then particular embodiments may return the search results and terminate the search query process. If the number of search results from the recent photo partition does not exceed the specified threshold, then particular embodiments may access the main photo partition to retrieve additional search results (if there is any).

The social-networking system may rank a particular object by a number of edges (i.e., a number of known relationships) connecting to a node corresponding to the particular object in the social graph. For example, the social-networking system may rank a photo object by a number of "likes" associated with the photo object. For instance, a photo liked by 15 users can be ranked higher than another photo liked by 7 users. For another example, the social-networking system may also rank a photo object by a number of users tagged to the photo object. For yet another example, the social-networking system may rank a page object (corresponding to a web page) by a number of "likes" or "check-ins" associated with the page object. This disclosure contemplates any suitable methods for ranking objects of the social-networking system. Particular embodiments may partition storage of objects of the social-networking system by a ranking of each object. For example, particular embodiments may store all page objects in a main page partition, while storing page objects with a number of edges connecting to respective corresponding nodes in the social graph exceeding a specified number (e.g., 50) in a higher-ranking page partition. The higher-ranking page partition may have smaller size than the main page partition, thus can be more easily duplicated to improve performance in accessing and retrieving page objects. Moreover, the higher-ranking page partition may have a smaller search index than that for the main page partition, thus may have better performance in accessing and retrieving page objects. For example, particular embodiments may, for a search query with a page result-type, submit the search query to the higher-ranking page partition first. If a number of search results from the higher-ranking page partition exceeds a specified threshold (e.g., 7), then particular embodiments may return the search results and terminate the search query process. If the number of search results from the higher-ranking page partition does not exceed the specified threshold, then particular embodiments may access the main page partition to retrieve additional search results (if there is any).

Particular embodiments may partition storage of objects of the social-networking system based on frequently used search terms. For example, particular embodiments may provide five search terms such as (photos_created_by:<user>), (tagged_in_photo:<user>), (photos_liked_by:<user>), (comment_on_photo:<user>), and (tagged_in_photo:) for searches queries with a photo result-type. Particular embodiments may determine that two search terms (tagged_in_photo:<user>) and (tagged_in_photo:) are most frequently used search terms. For example, particular embodiments may store photo objects in a main photo partition with its search index indexing all five available search terms. Particular embodiments may store photo objects in a frequently-searched photo partition with its search index indexing the two most frequently used search terms. The frequently-searched photo partition may have a search index smaller than that for the main photo partition, thus providing better performance in accessing and retrieving photo objects. For example, if a particular photo search term is one of the most frequently used search terms, particular embodiments may submit the particular photo search term to the frequently-searched photo partition. Otherwise particular embodiments may submit the particular photo search term to the main photo partition.

Figure 5:
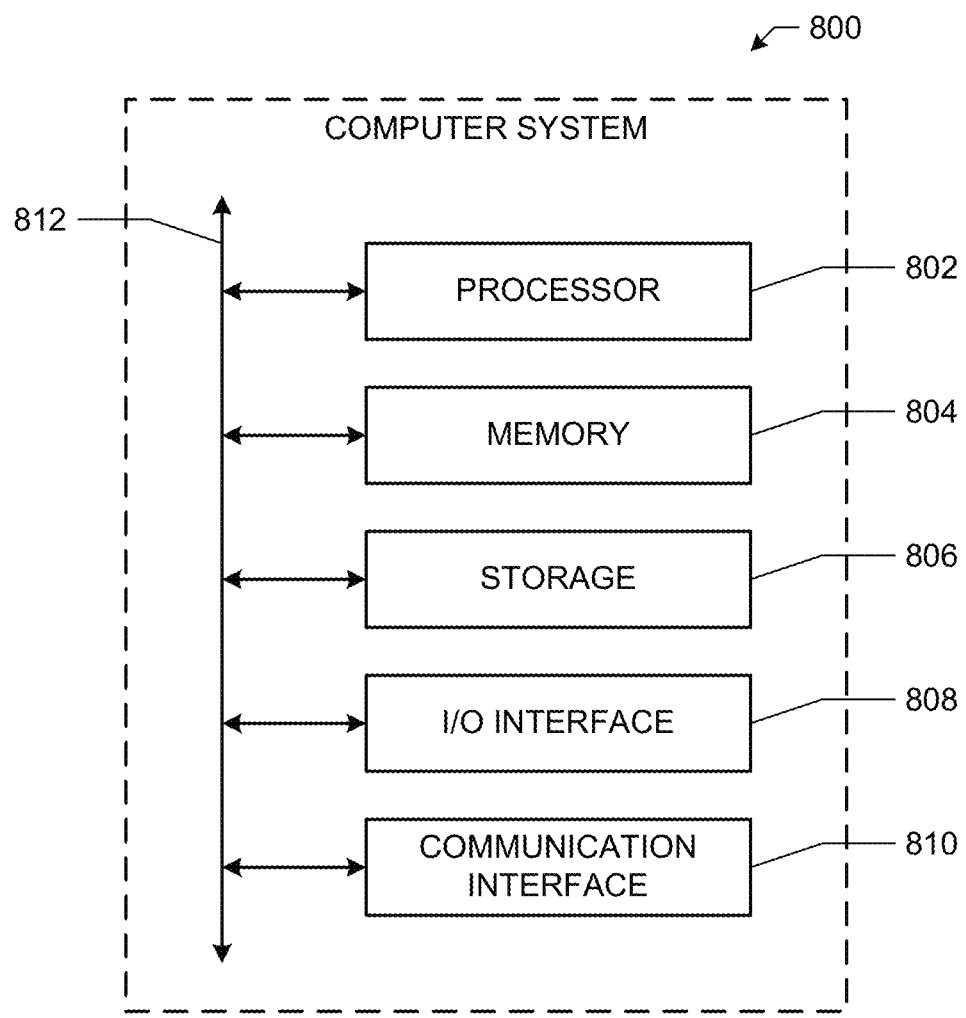
FIG. 5 illustrates an example computer system.

FIG. 5 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   receiving a search request for at least one of a plurality of objects of a social-networking system, wherein:
      the social-networking system comprises a social graph that comprises a plurality of nodes and a plurality of edges connecting the nodes;
      each object corresponds to a node of the social graph;
      the objects of the social-networking system are stored by a plurality of partitions of a database that are each configured to store objects of only a particular one of a plurality of object types;
      the objects in the partitions are indexed by a plurality of search indices that each index only a particular one of the plurality of partitions; and
      each search index indexes objects with information identifying edges connecting the nodes represented by the objects to other nodes in the social graph and with information identifying the other nodes;
   determining one or more search queries based on the search request wherein, each search query has a single object type for its expected search results;
   sending each search query to the partition that is configured to store objects of only the particular one of the object types that the search query has for its expected search results;
   for each search query, attempting to retrieve one or more search results from the partition that the search query was sent to, wherein the search results were identified using the search index that indexes only the partition; and
   aggregating search results retrieved from the partitions that the search queries were sent to.

2. The method of claim 1, wherein the plurality of object types comprise user profile, photo, post, web page, or application.

3. The method of claim 1, wherein one or more of the search queries each comprise a nested search query.

4. The method of claim 1, wherein sending each search query to the partition that is configured to store objects of only the particular one of the object types that the search query has for its expected search results comprises sending the search query to the search index that indexes only the partition that is configured to store objects of only the particular one of the object types that the search query has for its expected search results.

5. The method of claim 1, wherein each partition comprises the search index that indexes only the partition.

6. The method of claim 1, wherein the information identifying edges that each search index indexes object with comprises relationships indicated by edges.

7. The method of claim 1, wherein each search index is hosted by a respective one of a plurality of servers.

8. One or more computer-readable non-transitory storage media embodying software that is operable when executed to:
receive a search request for at least one of a plurality of objects of a social-networking system, wherein:
the social-networking system comprises a social graph that comprises a plurality of nodes and a plurality of edges connecting the nodes;
each object corresponds to a node of the social graph;
the objects of the social-networking system are stored by a plurality of partitions of a database that are each configured to store objects of only a particular one of a plurality of object types;
the objects in the partitions are indexed by a plurality of search indices that each index only a particular one of the plurality of partitions; and
each search index indexes objects with information identifying edges connecting the nodes represented by the objects to other nodes in the social graph and with information identifying the other nodes;
determine one or more search queries based on the search request wherein, each search query has a single object type for its expected search results;
send each search query to the partition that is configured to store objects of only the particular one of the object types that the search query has for its expected search results;
for each search query, attempt to retrieve one or more search results from the partition that the search query was sent to, wherein the search results were identified using the search index that indexes only the partition; and
aggregate search results retrieved from the partitions that the search queries were sent to.

9. The media of claim 8, wherein the plurality of object types comprise user profile, photo, post, web page, or application.

10. The media of claim 8, wherein one or more of the search queries each comprise a nested search query.

11. The media of claim 8, wherein sending each search query to the partition that is configured to store objects of only the particular one of the object types that the search query has for its expected search results comprises sending the search query to the search index that indexes only the partition that is configured to store objects of only the particular one of the object types that the search query has for its expected search results.

12. The media of claim 8, wherein each partition comprises the search index that indexes only the partition.

13. The media of claim 8, wherein the information identifying edges that each search index indexes object with comprises relationships indicated by edges.

14. The media of claim 8, wherein each search index is hosted by a respective one of a plurality of servers.

15. A system comprising:
one or more processors; and
one or more computer-readable non-transitory storage media embodying software that is operable when executed by the processors to:
receive a search request for at least one of a plurality of objects of a social-networking system, wherein:
the social-networking system comprises a social graph that comprises a plurality of nodes and a plurality of edges connecting the nodes;
each object corresponds to a node of the social graph;
the objects of the social-networking system are stored by a plurality of partitions of a database that are each configured to store objects of only a particular one of a plurality of object types;
the objects in the partitions are indexed by a plurality of search indices that each index only a particular one of the plurality of partitions; and
each search index indexes objects with information identifying edges connecting the nodes represented by the objects to other nodes in the social graph and with information identifying the other nodes;
determining one or more search queries based on the search request wherein, each search query has a single object type for its expected search results;
sending each search query to the partition that is configured to store objects of only the particular one of the object types that the search query has for its expected search results;
for each search query, attempting to retrieve one or more search results from the partition that the search query was sent to, wherein the search results were identified using the search index that indexes only the partition; and
aggregate search results retrieved from the partitions that the search queries were sent to.

16. The system of claim 15, wherein the plurality of object types comprise user profile, photo, post, web page, or application.

17. The system of claim 15, wherein one or more of the search queries each comprise a nested search query.

18. The system of claim 15, wherein sending each search query to the partition that is configured to store objects of only the particular one of the object types that the search query has for its expected search results comprises sending the search query to the search index that indexes only the partition that is configured to store objects of only the particular one of the object types that the search query has for its expected search results.

19. The system of claim 15, wherein each partition comprises the search index that indexes only the partition.

20. The system of claim 15, wherein the information identifying edges that each search index indexes object with comprises relationships indicated by edges.

* * * * *